United States Patent [19]

Clapp et al.

[11] Patent Number: 5,431,719

[45] Date of Patent: * Jul. 11, 1995

[54] NON-AEROSOL FOODSTUFFS PARTING COMPOSITION

[75] Inventors: Clarence P. Clapp; George S. Torrey, both of Danville, Ill.

[73] Assignee: Creative Products Inc. of Rossville, Rossville, Ill.

[*] Notice: The portion of the term of this patent subsequent to Mar. 22, 2011 has been disclaimed.

[21] Appl. No.: 215,847

[22] Filed: Mar. 21, 1994

Related U.S. Application Data

[63] Continuation-in-part of Ser. No. 967,511, Oct. 28, 1992, Pat. No. 5,296,021.

[51] Int. Cl.$^6$ .................................................. A23D 9/00
[52] U.S. Cl. .................................................. 106/2; 106/243; 106/267; 106/652; 106/263; 106/244; 426/811; 426/602; 426/609; 426/662
[58] Field of Search ............... 106/243, 267, 652, 263, 106/244, 2; 426/811, 602, 609, 662

[56] References Cited

U.S. PATENT DOCUMENTS

| | | | |
|---|---|---|---|
| 3,231,391 | 1/1966 | Breivik et al. | 99/139 |
| 3,301,881 | 1/1967 | Davis | 260/403 |
| 3,896,975 | 7/1975 | Follmer | 106/244 |
| 4,073,411 | 2/1978 | Doumani | 106/244 |
| 4,073,412 | 2/1978 | Doumani | 106/244 |
| 4,188,412 | 2/1980 | Sejpal | 426/609 |
| 4,325,980 | 4/1982 | Rek et al. | 426/604 |
| 4,339,465 | 7/1982 | Strouss | 426/293 |
| 4,371,451 | 2/1983 | Scotti et al. | 426/811 |
| 4,425,164 | 1/1984 | Bliznak et al. | 106/150 |
| 4,479,977 | 10/1984 | Dashiell et al. | 426/609 |
| 4,524,085 | 6/1985 | Purves et al. | 426/601 |
| 4,528,201 | 7/1985 | Purves | 426/262 |
| 4,654,221 | 3/1987 | Purves et al. | 426/811 |
| 4,943,389 | 7/1990 | Weete et al. | 252/308 |
| 5,156,876 | 10/1992 | Clapp et al. | 426/811 |
| 5,296,021 | 3/1994 | Clapp et al. | 106/2 |

FOREIGN PATENT DOCUMENTS 141842  7/1986  Japan .

Primary Examiner—Mark L. Bell
Assistant Examiner—C. M. Bonner
Attorney, Agent, or Firm—Victor E. Libert; Frederick A. Spaeth

[57] ABSTRACT

A foodstuffs parting composition for coating cooking surfaces composed of a water-in-oil emulsion prepared from lecithin, an edible oil component, an emulsifying agent selected from the group consisting of one or more of monocalcium phosphate, calcium chloride dihydrate, dibasic magnesium phosphate trihydrate and potassium chloride, and water. The lecithin is preferably acetylated lecithin, and the preferred emulsifying agent is monocalcium phosphate and is present in an amount of at least about 1 percent by weight of the composition. In alternative embodiments, mono- and diglycerides, including, e.g., phosphated mono- and diglycerides, are used as substitutes for the lecithin. Medium chain triglycerides are sometimes used with or in place of the edible oil as part of the edible oil component.

23 Claims, No Drawings

NON-AEROSOL FOODSTUFFS PARTING COMPOSITION

RELATED APPLICATIONS

This application is a continuation-in-part of U.S. application Ser. No. 07/967,511, filed Oct. 28, 1992, presently U.S. Pat. No. 5,296,021, the disclosure of which is incorporated herein by reference.

BACKGROUND OF THE INVENTION

1. Field of the Invention

The present invention relates to a parting composition for use in cooking foodstuffs, more especially to a parting composition of the type applied to cooking utensils, such as baking and frying pans and the like, in order to prevent or inhibit food from sticking to the utensil during cooking and to facilitate cleaning the utensil.

2. Background and Related Art

The prior art has devoted considerable effort to providing lecithin-containing food parting compositions for coatings on utensils which do not impart undesirable flavors to, or discolor, foodstuffs and which have a minimum calorie content. The coatings, which may be used in lieu of oils, grease, butter, etc. to lubricate food-contact surfaces of cooking utensils such as frying and baking pans, facilitate the separation of cooked foodstuffs from cooking surfaces. The use of lecithin, a naturally-occurring substance usually derived from soybeans, is known for this purpose and conventional food release compositions comprise a mixture of lecithin, an edible oil and other known additives.

U.S. Pat. No. 4,479,977, issued Oct. 30, 1984 to Dashiell et al discloses various methods of making acetylated lecithin and its use in food release compositions and in Example 9 recites the use of acetylated lecithin in combination with vegetable oil, 190 proof ethanol, and hydrocarbon propellant for use in aerosols.

U.S. Pat. No. 3,301,881 to Davis, dated Jan. 31, 1967 discloses a emulsion comprising an oil-in-water emulsion comprising 1.0 grams acetylated lecithin, 10 grams cottonseed oil and 90 ml water (see Example 3).

U.S. Pat. No. 4,654,221 to Purves et al, dated Mar. 31, 1987 teaches the utility of phosphate salts, including monocalcium phosphate, as anti-sticking agents to be added to cooking fats for non-emulsion type parting compositions. It is taught that by using the phosphate salts, lecithin can be advantageously eliminated as an antisticking agent, but several example compositions comprised 0.4 percent lecithin by weight of the composition (see TABLE I). Purves et al teach away from the use of lecithin to prevent off-flavor development and thermal darkening during cooking (see column 2, lines 58-60; column 3, lines 18-20 and column 6, lines 27-29) and that the salts are effective in amounts of 0.001 percent by weight of the composition, preferably 0.01 to about 0.5 percent by weight (see column 5, lines 53-57).

U.S. Pat. No. 4,339,465 to Strouss, dated Jul. 13, 1982, teaches the use of a liquid composition comprising a liquid emulsifier and at least about 80 percent water and, optionally liquid lecithin. The liquid emulsifier contains monoglycerides, diglycerides and a polysorbate compound.

SUMMARY OF THE INVENTION

Generally, the present invention provides a parting composition for cooking foodstuffs, the composition utilizing lecithin and/or mono- and diglycerides in combination with an edible oil component, an emulsifying agent and water to provide a water-in-oil emulsion.

More specifically, a foodstuffs parting composition according to the present invention comprises a water-in-oil emulsion comprising, in addition to water, a release agent that comprises at least one of (a) lecithin and (b) mono- and diglycerides, e.g., phosphated mono- and diglycerides. There is also an edible oil component, and an emulsifying agent in an amount effective to facilitate the formation of the water-in-oil emulsion. The emulsifying agent is selected from the group consisting of monocalcium phosphate, calcium chloride dihydrate, dibasic magnesium phosphate trihydrate, potassium chloride, and combinations thereof.

According to one aspect of the invention, the release agent may comprise a chemically modified lecithin, e.g., acetylated-hydroxylated lecithin or acylated lecithin, e.g., acetylated lecithin, which is preferably used in amounts of at least about 4 percent by weight of the composition. Optionally, in addition to the lecithin, or in place thereof, the release agent may comprise mono- and diglycerides. Thus, the release agent may be substantially free of lecithin. Preferably, the mono- and diglycerides constitute not more than about 9 percent by weight of the composition.

According to another aspect of the invention, the emulsifying agent may constitute from about 0.1 to about 9 percent by weight of the composition. In some embodiments, the emulsifying agent may constitute greater than 0.5 percent of the composition. For example, the emulsifying agent may comprise monocalcium phosphate in an amount greater than 0.5 percent by weight of the composition, e.g., from about 1.0 to about 4.0 percent by weight.

According to another aspect of the invention, the edible oil component may comprise an edible oil and may constitute from about 10 to about 45 percent by weight of the composition. Optionally, in addition to the edible oil, or in place thereof, the edible oil component may comprise medium chain triglycerides. Thus, the edible oil component may be substantially free of edible oils. Preferably, the medium chain triglycerides constitute not more than about 5 percent by weight of the composition.

In various embodiments of the invention, the release agent may constitute from about 1 to about 20 percent by weight of the composition; the edible oil component may constitute from about 10 to about 45 percent by weight of the composition; and the emulsifying agent may constitute at least about 1.0 percent by weight of the composition.

Another aspect of the invention provides that the parting composition may further comprise a supplemental emulsifying agent comprising at least one polyglycerol ester of a fatty acid, in an amount of from about 0.1 to about 6.0 percent by weight of the composition. For example, the supplemental emulsifying agent may comprise at least one of decaglyceroldecaoleate and decaglyceroloctaoleate.

In various embodiments, parting compositions according to the present invention may also comprise an effective amount of a suspending agent.

As used herein and in the claims, the term "percent" used with reference to a particular component means the weight of that component in the composition divided by the total weight of the composition, including that of the particular component, with the result multiplied by 100, unless otherwise indicated.

As used herein and in the claims, the term "water-in-oil emulsion" means a heterogeneous suspension of an internal or discontinuous phase of water droplets in a continuous or "external" oil phase. Conversely, the term "oil-in-water emulsion" means heterogeneous suspension of a discontinuous oil phase in a continuous water phase.

In addition, the term "emulsifying agent" will refer to the compounds indicated herein, e.g., monocalcium phosphate, etc. It is recognized that lecithin is often considered to act as an emulsifier, but since some embodiments of the invention may not form an emulsion in the absence of monocalcium phosphate or another one of the alternative agents disclosed herein, the term "emulsifying agent" as used herein and in the claims, shall be understood as not including lecithin unless specifically so indicated.

The term "emulsion waterphase" is used herein to refer to the water extracted from an emulsion by breaking down the emulsion and removing the thus separated aqueous layer.

Other aspects of the present invention are disclosed in the following detailed description of the invention and of certain embodiments thereof.

DETAILED DESCRIPTION OF THE INVENTION AND CERTAIN EMBODIMENTS THEREOF

A food parting or food release composition according to the present invention is useful for preventing cooked foodstuffs from sticking to the cooking utensils, thereby facilitating the removal of the foodstuffs from, and cleaning of, the cooking utensils. The parting composition is packaged in any one of a number of conventional containers without the need for a pressurized liquifiable-type aerosol propellant to promote the formation of an emulsion, e.g., the composition may be dispersed from pump-spray containers, spouted containers for pouring out the composition, tub-type containers into which an applicator brush may be dipped, etc. The suitability of the compositions according to the present invention for use without a pressurized liquifiable-type aerosol propellant is indicated herein by designating the compositions as non-aerosol food parting compositions, but this is not meant to foreclose dispersal of these compositions in aerosol form or under pressurized conditions. The viscosity of the parting composition in a pump-spray container should be low enough to ensure that the composition is easily dispensed through the pump-spray system; higher viscosities are better suited for wide-mouth containers.

Preferred embodiments of the water-in-oil emulsion-containing compositions of this invention provide emulsions which are stable at ambient temperatures for a period of one year or longer. The emulsion waterphase of these compositions may have a stable pH of between 3.7 and 4.6 for the life of the product, which is favored because microbial growth is believed to be retarded in such compositions. When applied as a coating, parting compositions according to the present invention are generally opaque and relatively smooth.

The parting compositions of this invention comprise a water-in-oil emulsion comprising a release agent that may comprise lecithin, e.g., an acylated lecithin, more preferably acetylated lecithin; and/or mono- and di-glycerides; an edible oil component; one or more emulsifying agents; and water; and optionally, one or more of a humectant, a suspending agent, a modifying agent, a supplemental emulsifying agent, blocking agents, a flavoring additive and other known additives.

Lecithin is a complex mixture of acetone-insoluble phosphatides (phospholipids) comprised mostly of phosphatidylcholine and lesser amounts of phosphatidylethanolamine and phosphatidylinositol. Lecithin is comprised of the phosphatides and varying amounts of other materials such as triglycerides, diglycerides, monoglycerides, free fatty acids, free sterols and carbohydrates. Commercially available lecithins generally fall into three classes: natural lecithins, refined lecithins and chemically modified lecithins (i.e., acylated, hydroxylated, and acetylated-hydroxylated lecithins), and are available in fluid form containing the above components in various combinations and proportions dissolved in soybean oil, usually containing from about 50 to about 65 percent acetone-insolubles (phospholipids) by weight of lecithin including the oil. In liquid form, the lecithin is available in different viscosities. The lecithin may be unbleached or, in order to lighten its color, it may be bleached, usually by peroxides, and may be filtered or otherwise refined.

Lecithin contains different functional groups that make it reactive in a number of chemical reactions. Chemically modified lecithins best suited for use in the compositions of this invention include acylated, preferably acetylated lecithin and acetylated-hydroxylated lecthin.

The lecithin is present in the emulsion in amounts of from about 1 to about 20 percent by weight, for example, from about 1 to about 12 percent by weight of the composition. The quantity of lecithin may be adjusted to provide a phospholipid content of from about 0.5 to about 11 percent by weight of the composition. In a particular embodiment, the lecithin constitutes at least about 4.5 percent by weight of the composition. Acetylated lecithin is preferred because, as demonstrated in the parent case to this application, it provides improved long term stability and generally better emulsion-forming characteristics than standard lecithin.

In addition to lecithin, or in place thereof, the release agent may comprise mono- and di-glycerides of edible fatty materials, and preferably may comprise phosphated derivatives thereof. Generally, these non-lecithin release agents are free of nitrogen derivatives. Generally, the non-lecithin release agent is used in amounts of not more than about 10.0 percent, e.g., from about 0.1 to about 10 percent by weight of the composition, to enhance the release characteristics of the composition. While the examples reported below show only the use of phosphated mono- and diglycerides, it is believed that commercially available phosphated mono- and diglycerides contain significant quantities of non-phosphated glycerides, and that the non-phosphated mono- and diglyceride fraction is effective as a release agent on its own. Accordingly, the term "phosphated mono- and diglycerides", as used herein and in the claims, is used to indicate materials that comprise those phosphated species but does not necessarily exclude the presence of non-phosphated precursors thereof. However, the term "mono- and diglycerides" is used herein to indicate mono- and diglycerides generally, whether or not they are phosphated, and is therefore intended to read on both phosphated mono- and diglycerides and their nonphosphated counterparts and to indicate each without regard to the other.

The edible oil component may comprise any suitable edible oil or mixture of edible oils. Such oils include, by way of example and not by way of limitation, canola, partially hydrogenated winterized canola, soybean, corn, olive, peanut, cottonseed, safflower, hydrogenated soybean oil, partially hydrogenated winterized soybean, sunflower oils, mineral oil such as that designated "white mineral oil" under the nomenclature of the U.S. Food and Drug Administration, and mixtures thereof. Preferably, mineral oil is limited to about 10 percent, more preferably about 5 percent by weight of the composition. The total edible oil in the emulsion, including oil from the lecithin and any oil added thereto is from about 10 to about 45 percent by weight, for example, from about 20 to about 30 percent by weight of the composition. The edible oil may optionally be supplemented with, or in some cases, replaced by, medium chain triglycerides in an amount of up to about 25 percent, preferably not more than about 5 percent by weight of the composition. Medium chain triglycerides are generally characterized as triglycerides comprising $C_8$–$C_{12}$ fatty acids, whereas oils generally comprise longer chain triglycerides, e.g., $C_{12}$–$C_{22}$ fatty acids. Preferred medium chain triglycerides comprise saturated fatty acids. As used herein and in the claims, the term "edible oil component" is meant to encompass both medium chain triglycerides and conventional edible oils such as those indicated above. Thus, the edible oil component may be completely or substantially free of edible oils, provided a suitable quantity of medium chain triglycerides is used in place thereof.

The parting compositions according to the present invention comprise an emulsifying agent to facilitate the formation of a stable water-in-oil emulsion for the lecithin with edible oil and water by the use of previously unknown emulsifying agents. The emulsifying agents may be selected from monocalcium phosphates (e.g., anhydrous and monohydrate), calcium chloride dihydrate, magnesium phosphate dibasic trihydrate, and potassium chloride. These materials have been demonstrated in the parent application to allow chemically modified lecithins to form emulsions so that they can be used as substitutes for natural lecithins in formulations where the chemically modified lecithins would not otherwise form emulsions. In particular, the Applicants have found that monocalcium phosphate facilitates the formation of emulsions comprising acetylated lecithin.

The emulsifying agent is generally present in amounts of from about 0.1 to about 8 percent, e.g., 0.1 to 4 percent, by weight of the composition. It has been found that attempts to prepare a foodstuffs parting composition comprising acetylated lecithin, oil, monocalcium phosphate as the emulsifying agent and water did not yield a water-in-oil emulsion when the monocalcium phosphate comprised less than about 1 percent by weight of the composition; rather, an oil-in-water emulsion formed. However, oil-in-water emulsions are not considered to be suitable for use as a foodstuffs parting composition. Accordingly, it appears to be preferable for the emulsifying agent to constitute at least about 1 percent by weight of the composition, at least when monocalcium phosphate is the sole emulsifying agent for use with acetylated lecithin.

Preferably, the pH of the emulsion waterphase is maintained at between 3.7 and 4.6, within which range the long-term stability of the emulsion is enhanced. Also, at pH equal to or less than 4.6, the composition qualifies as an acid food which resists microbial growth that may lead to spoilage or, in the case of toxin-producing anaerobic spore-forming bacteria such as *Clostridium botulinum*, that may cause food poisoning. When the emulsifying agent comprises monocalcium phosphate in amounts of from about 0.5 to about 4 percent by weight of the composition, the desired waterphase pH range of from about 3.7 to about 4.6 is achieved. However, in some instances, e.g., where a low pH is not required for inhibiting bacterial growth, the pH can be raised to as much as 9.5 by the addition of a suitable base such as potassium hydroxide.

As demonstrated in the Examples below and further in U.S. application Ser. No. 07/967,511, now U.S. Pat. No. 3,296,021, the addition of the monocalcium phosphate results in rapid formation of an emulsion that incorporates a broad range of quantities of formula water and which have a homogeneous appearance characteristic of a well-formed emulsion. The monocalcium phosphate is commercially available and in some instances is sold coated with, for example, various magnesium, potassium and aluminum phosphates. A preferred monocalcium phosphate is an anhydrous monocalcium phosphate sold under the trade name V-90 by Rhône-Poulenc Basic Chemicals Co. of Shelton, Conn.

Optionally, a supplemental emulsifying agent selected from polyglycerol esters of fatty acids may be added to the composition in addition to the emulsifying agents described above, typically in amounts of not more than about 6.0 percent, e.g., from about 0.1 to about 6.0 percent by weight of the composition. Typical of compounds that may serve as supplemental emulsifiers are decaglyceroloctaoleate and decaglyceroldecaoleate, both of which were obtained from Calgene Chemical, Inc. under the trade designations HODAG PGO-108 and HODAG PGO-1010, respectively. These supplemental emulsifying agents improve the stability of the emulsions of the present invention.

The water content of the water-in-oil emulsion is generally from about 13 to about 75 percent by weight, for example, from about 40 to about 60 percent by weight of the composition.

The composition of this invention may contain one or more of a suspending agent and/or a flavoring additive and the like.

Water-in-oil emulsions according to this invention may contain a suspending agent which is believed to prevent the discontinuous phase of the water-in-oil emulsion from settling. The suspending agent should not adversely affect the release properties of the composition to any significant degree, and should not clog a pump-spray valve. Suitable suspending agents include silicon dioxides, such as colloidal silica, precipitated silica or fumed silica and combinations thereof. The suspending agent is typically present in amounts of from less than about 0.5 percent, for example, from about 0.5 to about 2.0 percent by weight of the composition.

The parting compositions containing the water-in-oil emulsion of this invention may be prepared by mixing or blending the ingredients in an appropriate container. Preferably, the edible oil, if any, is added first, followed by any medium chain triglyceride material, then lecithin and/or the phosphated mono- and diglcerides or a combination of the two as desired. Then, the supplemental emulsifiers, if any, are added, and then, with continued mixing, the monocalcium phosphate and/or other emulsifying agents, and then water. Water should be added at a rate that allows it to be incorporated into the emulsion in an ongoing basis.

Suitable mixing devices for laboratory preparation of emulsions according to the present invention include handheld, kitchen-type food mixers with attached beaters, e.g., Sunbeam Mixmaster, Heavy Duty, Model No. 03181, manufactured by the Sunbeam Appliance Co., or a kitchen-type food blender adjusted to the lowest speed or converted to a variable speed by means of a rheostat. These mixing and blending devices are operated at speeds (energy levels) appropriate to mix ingredients rather than to cause sufficient shear to facilitate homogenization. It is believed, without wishing to be bound by any particular theory, that emulsification is achieved due to the emulsifying characteristics of ingredients rather than input of kinetic energy from high speed mixing or homogenization.

Some of the examples of aerosol formulations presented in the parent application are instructive for purposes of the present invention and are reproduced herein as Examples 1-5. The parting compositions containing the water-in-oil emulsion of the parent application may be prepared by forming a pre-emulsion concentrate as a precursor to the emulsion. Generally, in forming the pre-emulsion concentrate, the total amount of chemically modified lecithin, the oil, the emulsifying agent and other formula constituents beside the propellant, e.g., blocking agent, suspending agent, etc., to be used in the composition are placed in a mixing container along with a portion of the full amount of water called for by the formula for the finished compositions, i.e., the "formula water". However, the supplemental emulsifying agent, if used, may be incorporated into either the pre-emulsion concentrate or the balance of water added later. The portion of the formula water used to prepare the pre-emulsion concentrate may vary depending on the concentration of the lecithin of the finished composition, but is typically from about 4 to about 16 percent by weight of the finished composition, whereas formula water generally comprises from about 13 to 67 percent of the finished composition. Typically, the charge of water used to prepare the pre-emulsion concentrate constitutes from about 7 to about 21 percent of the total water called for in the formulation. In any event, enough of the formula water is used so that the pre-emulsion concentrate is fluid. The ingredients of the pre-emulsion concentrate are blended in a conventional blending apparatus until the ingredients are uniformly mixed and the pre-emulsion concentrate is then homogenized.

One example of a suitable mixing device for laboratory preparation of the aerosol formulation emulsion is a hand-operated homogenizer Model 6HH030 manufactured by Chase-Logeman Corporation, Greensboro, N.C. This device is rated to develop a maximum force of 1,000 pounds per square inch. Another suitable piece of homogenization equipment is a two-stage, laboratory homogenizer with a maximum operating pressure of 5,000 pounds per square inch, manufactured by APV Gaulin, Inc. of Wilmington, Mass.

The pre-emulsion concentrate is mixed continuously until it is placed in the aerosol can. The remainder of the formula water (about 36 to 51 percent by weight) is heated to about 140° F. and is placed in an aerosol can with the pre-emulsion concentrate. The aerosol valve may then be crimped in place to close the container, propellant is added and the container may be mechanically shaken to aid emulsification. Usually, preparation of the composition is carried out at ambient temperatures, generally from about 21° C. to 32° C. (70° F. to 90° F.), preferably at a temperature of from about 24° C. to 27° C. (75° F. to 80° F.).

All references in Examples 1-5 below, to "%" or "percent", mean percent by weight of the composition unless otherwise specifically noted. All such references to various lecithins refer to fluid lecithins, i.e., lecithins dissolved in an edible oil; generally the lecithins used in the examples comprised about 54.5% phospholipids and about 45.5% oil. The indicated quantities for lecithins thus include quantities of the solvent oil. References in the formulae to % oil, e.g., % partially hydrogenated winterized soybean oil, refer to added oil, and do not include the oil associated with the lecithin as discussed above unless specifically so indicated. Thus, it will be understood that in the following Examples 1-5, the total edible oil in compositions according to the invention is provided in two ways: as oil incorporated into fluid lecithin, and as added oil. It will also be appreciated that the relative percentages of lecithin and added oil may be adjusted to accommodate fluid lecithins that vary in phospholipid content.

Example 1

To determine whether natural, refined or chemically modified (i.e., hydroxylated, acetylated and acetylated-hydroxylated) lecithins satisfactorily form water-in-oil emulsions, seventeen formulations containing natural, refined and chemically modified commercial lecithins as described below in TABLE I were prepared. All the formulations contained 17.9% partially winterized soybean oil, one of the aforesaid lecithins (in fluid form) in amounts to provide 3.3% phospholipids (equivalent to 6% by weight of fluid lecithin having 54.5% phospholipids by weight of the lecithin), 18% hydrocarbon propellant and the remainder of the formulation being water so that the percentage totaled 100 percent. Four formulations comprised natural lecithins, including unbleached, single bleached and filtered single bleached. Seven formulations comprised refined lecithins; one was highly filtered, the others were custom blended. Six formulations comprised chemically modified lecithins, i.e., hydroxylated lecithin (2 formulations) acetylated lecithin (3 formulations, including one highly filtered) and acetylated-hydroxylated lecithin (1 formulation).

The formulations were prepared by first forming a pre-emulsion concentrate by combining in a beaker the oil, lecithin, and water in an amount equal to 8% of the final weight of the composition. The ingredients were mixed to homogeneity using a hand-held mixer sold by Sunbeam Appliance Company under the trade designation MixMaster and the mixture was then homogenized in a hand-operated homogenizer Model 6HH030 manufactured by Chase-Logeman Corporation, Greensboro, N.C., operated at a force of 1,000 pounds per square inch. The pre-emulsion concentrate and the remainder of formula water heated to 140° F. were added to an appropriate aerosol container that was then sealed and filled with 18% propellant and then shaken by hand to promote emulsification.

All of the formulations that comprised natural or refined lecithins formed emulsions; none of the formulations that comprised chemically modified lecithin formed emulsions.

Then, the procedure of Example 1 was exactly repeated except that 1% monocalcium phosphate (sold under the trade designation V-90 by Rhône Poulenc) by weight was added to each formulation in the preparation of the pre-emulsion concentrate and the amount of water added to the final emulsion was reduced by 1%. Emulsions were formed with all the formulations, including those comprising chemically modified lecithins. These results demonstrate that monocalcium phosphate assists in forming a water-in-oil emulsion with chemically modified lecithins at the stated oil and lecithin concentrations.

Example 2

To determine the influence of monocalcium phosphate and various other compounds on emulsification and on water phase pH, fourteen formulations containing acetylated lecithin were prepared by the pre-emulsion concentrate procedure of Example 1. The formulations contained 1% of the compound listed in TABLE I(A) and were prepared by forming a pre-emulsion concentrate as described in Example 1. The formulations all contained 17.9% of added partially hydrogenated winterized soybean oil, 6% of fluid acetylated lecithin, 57.1% water and 18% hydrocarbon propellant by weight.

The appearance of the emulsion was observed in glass aerosol bottles and characterized in TABLE IA as follows:
I=incomplete emulsification of water with free water visible.
C=emulsion completely formed with no free water visible.
G=granular appearance of the emulsion.
Y=creamy appearance of the emulsion.

TABLE I(A)

| Compound | Formulation Number | Emulsion formed, appearance |
|---|---|---|
| Monocalcium phosphate, monohydrate | 1 | C |
|  | 2 | I |
|  | 3 | C,Y |
|  | 4 | C,Y |
| Monocalcium phosphate, anhydrous (1) | 5 | C,Y |
|  | 6 | C,Y |
| Calcium phosphate dibasic | 7 | I |
|  | 8 | I |
| Calcium phosphate tribasic | 9 | I |
|  | 10 | I |
| Calcium chloride | 11 | C,Y |
| Calcium carbonate | 12 | I |
| Magnesium phosphate, dibasic, trihydrate | 13 | C,Y |
|  | 14 | I |
| Potassium chloride | 15 | C,G |
| Potassium phosphate, monobasic | 16 | I |
| Trisodium phosphate, dodecahydrate | 17 | I |
| Disodium phosphate, duohydrate | 18 | I |
| Sodium hexametaphosphate | 19 | I |

(1) Formulations 5 and 6 were prepared using anhydrous monocalcium phosphate obtained from Rhone Poulenc under the designation V-90 (Food Grade) and Monsanto under the designation Pyran (Food Grade), respectively.

The data of TABLE I(A) show that two forms of monocalcium phosphate, calcium chloride dihydrate, dibasic magnesium phosphate trihydrate, and potassium chloride all function as emulsifying agents for chemically modified lecithins.

The emulsion waterphase of each of the formulations of TABLE I(A) was extracted from its emulsion and its pH was measured and recorded. In addition, for comparison, the indicated compounds were added in the amounts used in the respective formulae to corresponding formula quantities of water, and the pH of the resulting (sometimes saturated) solutions were measured. The results are set forth in TABLE I(B).

TABLE I(B)

| Compound | Formulation Number | pH Water Solution | pH Separated emulsion waterphase |
|---|---|---|---|
| Monocalcium phosphate, monohydrate | 1 | 3.4 | 4.1 |
|  | 2 | 2.9 | 3.9 |
|  | 3 | 3.3 | 4.6 |
|  | 4 | 3.9 | 4.5 |
| Monocalcium phosphate, anhydrous (1) | 5 | 4.0 | 4.5 |
|  | 6 | 3.9 | 4.4 |
| Calcium phosphate dibasic | 7 | 7.1 | 7.3 |
|  | 8 | 7.1 | 7.3 |
| Calcium phosphate tribasic | 9 | 5.8 | 7.2 |
|  | 10 | — | — |
| Calcium chloride dehydrate | 11 | 6.2 | 5.5 |
| Calcium carbonate | 12 | 8.7 | 7.3 |
| Magnesium phosphate, dibasic, trihydrate | 13 | 7.6 | 7.1 |
|  | 14 | — | — |
| Potassium chloride | 15 | 6.8 | 6.6 |
| Potassium phosphate, monobasic | 16 | 4.5 | 4.7 |
| Trisodium phosphate, dodecahydrate | 17 | 11.8 | 8.5 |
| Disodium phosphate, duohydrate | 18 | 8.7 | 7.7 |
| Sodium hexametaphosphate | 19 | 6.9 | 6.7 |

(1) Formulations 5 and 6 were prepared using anhydrous monocalcium phosphate obtained from Rhone Poulenc under the designation V-90 (Food Grade) and Monsanto under the designation Pyran (Food Grade), respectively.

The data of TABLE I(A) show that formulations comprising monocalcium phosphates in anhydrous or in some monohydric forms (numbers 1, 3–6), calcium chloride (number 11), dibasic magnesium phosphate trihydrate (number 13), and potassium chloride (number 15) were able to form emulsions successfully with chemically modified lecithin. In addition, as indicated by TABLE I(B), Formulations 1–6, comprising monocalcium phosphates, were able to maintain emulsion waterphase pH values in the desired range of 3.7 to 4.6, discussed above. The fact that the pH of simple solutions of corresponding quantities of the monocalcium phosphates in formula quantities of water are lower than the pH of the waterphase from the emulsions suggests that only a portion of the monocalcium phosphate in the emulsion is soluble or reacted in the waterphase, and that an insoluble portion remains suspended in the continuous or emulsion oil phase and serves as a reservoir for additional soluble material which may be able to migrate into the aqueous phase and act as a buffer against a rise in pH.

Example 3

A series of parting compositions were prepared to evaluate the long term stability and ease of formation of the emulsions they form. The formulations contained 17.9% partially hydrogenated winterized soybean oil (but Formulation 2 contained partially hydrogenated canola oil), either the natural or acetylated lecithin to provide a phospholipid content of 3.8%; 1% of monocalcium phosphate (anhydrous monocalcium phosphate, V-90, manufactured by Rhône Poulenc in Formulations 1, 2 and 3 and monohydric monocalcium phosphate, 12XX, manufactured by Rhône Poulenc in Formulation 4), 0.15% of phosphated mono- and diglycerides; 0.0001% of calcium carbonate, 18% hydrocarbon propellant and water, the percentage of which was adjusted so that formulas total 100 percent. Formulations 1 and 2 include 2.5% glycerine.

The formulations were prepared by first forming a pre-emulsion concentrate as described in Example 1 by combining as appropriate for each formulation the oil, lecithin, monocalcium phosphate, glycerine (where used) and 8% of the final composition weight as water. The ingredients were mixed to assure dispersion of water and then homogenized as described in Example 1. The pre-emulsion concentrate and the remainder of formula water (heated to 140° F.) were added to an appropriate aerosol container that was then sealed and filled with 18% propellant.

TABLE II summarizes the characteristics of the resulting formulations observed at the indicated intervals following their preparation. The emulsion viscosity was observed at room temperature one day after its formation and then at 130° F., 30 days after its formation. The color of the emulsion was observed after storage for 30 days at 130° F. and is set forth in TABLE II. Taste of the emulsion after storage for 3 months at 100° F. was also evaluated. The results are also set forth in TABLE II.

TABLE II

|  | Type of Lecithin | | |
|---|---|---|---|
|  | Chemically Modified | | Natural |
|  | Glycerine | No Glycerine | No Glycerine |
| Formulation | 1 | 2 | 3 |
| Emulsion formation. | | | |
| Time/hrs. | .05/4 | 4/24/48 | 4/24/48 |
| Observation(1) | C,G/C,Y | I/C,G/C,Y | I/I/C,G |
| Emulsion viscosity. | | | |
| 1 day ambient | water-like | water-like | water-like |
| 30 days 130° F. | water-like | water-like | thick |
| Emulsion color. | pale | pale | brownish |
| 30 days 130° F. | yellow | yellow | yellow |
| Emulsion taste. | slightly | slightly | metallic, |
| 3 mo. 100° F.) | tart | tart | oxidized |

The data in this TABLE II demonstrate that Formulations 1 and 2 which contain acetylated lecithin and monocalcium phosphate, emulsify more quickly than does Formulation 3 which contains natural lecithin and monocalcium phosphate. The inclusion of glycerine in Formulation 1 hastens emulsification compared to the rate of emulsification observed for the formulation containing the acetylated lecithin without glycerine (Formulation 2).

The data in TABLE II also demonstrate that Formulation 3 containing the natural lecithin and monocalcium phosphate, thickened after storage for 30 days at 130° F., and were thicker than formulations containing acetylated lecithin and monocalcium phosphate stored under the same conditions.

Further, the data in TABLE II demonstrate that Formulation 3 containing natural lecithin and monocalcium phosphate developed a brownish color after storage for 30 days at 130° F. This darkening is associated with heat sensitivity of natural lecithins. This brownish color was not observed in Formulations 1 and 2 (containing acetylated lecithin and monocalcium phosphate) and the original color was maintained in these formulations indicating resistance to changes induced by elevated temperatures.

Additionally, a sprayed emulsion formulated with natural lecithin and monocalcium phosphate (Formulation 3) had a metallic taste after 3 months storage at 100° F. indicating oxidation and developing rancidity in the product. In contrast, Formulations 1 and 2, containing acetylated lecithin and monocalcium phosphate, tasted characteristically of an acid emulsion under the same storage conditions and displayed no evidence of rancidity.

Example 4

Release tests were conducted on the formulations prepared and contained as described in Example 3, using a 9¾ inch by 7½ inch uncoated aluminum pan with 12 cavities measuring 1⅞ inches (4.76 cm) in diameter at the top, 1¼ inches (3.18 cm) in diameter at the bottom and ¾ inch (1.90 cm) in depth. The various formulations were applied to the pan by spraying each pan cavity in a circular fashion to favor the deposition of a uniform coating of 5 to 7 gm of spray on the entire pan surface. Each parting composition formulation was tested twice, once with Jiffy ® Blueberry Muffin Mix (7.0 ounce package) and once with Jiffy ® White Cake Mix, (9 ounce package), both obtained from Chelsea Milling Company, Chelsea, Mich. The muffin and cake batters were prepared according to the instructions on the box with the exception that the blueberry muffin mix was altered by addition of ½ teaspoon powdered buttermilk and by deleting all milk while adding ¼ cup water. The cake mix was altered by the addition of one large egg instead of one egg white, as indicated in the directions. In each test, 10.5 to 11.5 gm of batter was spooned into each cavity of the pan.

Once the pan was filled with batter, it was placed in an oven preheated to 350° F. The muffins were baked at this temperature for fifteen minutes, the cupcakes for twenty minutes. In each case, after the baking period, the pans were removed and allowed to cool for five minutes at room temperature. The pans were then inverted to an upside-down position to see if any of the muffins or cupcakes fell out, and the results were noted. While inverted, the pan was shaken once to see if additional cupcakes or muffins fell out, and the results were noted. The shakes were repeated one at a time until the upside-down pan was subjected to ten shakes and the number of cakes or muffins that fell out in each shake was recorded. At the end of ten shakes it was noted how many cupcakes or muffins, if any, remained in the pan.

The observations made during the shake procedure were quantified by assessing "points" according to the total number of shakes required to dislodge the cakes or muffins as follows. For each cake or muffin which fell out of its cavity upon the initial inversion of the pan without shaking, 0 points was charged; thereafter, each cavity accrued one point for each shake required to dislodge the cake or muffin baked in it. For each cake or muffin which remained in the pan after ten shakes, fifteen points were assessed to that pan cavity. The release value assigned each formulation is equal to the sum of points charged to the cavities in the pan divided by the number of cavities. Consequently, the lower the release number is, the more effective is the parting composition. The release characteristics were obtained by calculating an average release value obtained for blueberry muffins and cupcakes. The results of the two release tests were used to calculate average release values.

The results are shown in TABLE III.

TABLE III

| Formulation | Chemically Modified Glycerine 1 | Modified No Glycerine 2 | Natural No Glycerine 3 |
|---|---|---|---|
| | Baking release test values (average) | | |
| Initial | 0.12 | 0.08 | 0.16 |
| 1 mo. 130° F. | — | 0.12 | 10.62 |
| 3 mo. 100° F. | — | 0.62 | 9.30 |
| 12 mo. ambient | 0.29 | 0.42 | Emulsion broken |
| 12 mo. 100° F. | — | 12.66 | Emulsion broken |

The data in TABLE III show that baking release tests conducted with formulations containing acetylated and natural lecithins yielded similar results on initial testing when the formulations were first prepared. The same tests were conducted on formulations stored at 100° F. for 3 and 12 months, or at ambient temperatures (about 75° F.) for 12 months. The data demonstrate the superior stability and baking-release characteristics for formulations containing acetylated lecithin as compared to formulations prepared with identical amounts of phospholipids from natural lecithin that had not been acetylated. Emulsions containing natural lecithin and stored at either ambient temperatures or 100° F. did not perform as release agents and were no longer emulsions when tested. A fourth formulation, identical to Formulation 1 but comprising lightly hydrogenated canola oil instead of partially hydrogenated soybean oil was also prepared, was stored for six months at 100° F., and obtained a release value of 2.00.

The most significant results from release testing are data presented for Formulations 1 and 2 stored under ambient conditions for 12 months. These formulations contained acetylated lecithin and demonstrated only slight change in release test results from identical formulations tested 12 months earlier when initially prepared.

Example 5

A series of formulations was prepared containing varying amounts of acetylated lecithin and 1% monocalcium phosphate as an emulsifying agent, 17.9% partially hydrogenated winterized soybean oil, 2% glycerine, 18% hydrocarbon propellant and water, the percentage of which was adjusted so that the formulations totaled 100%. The quantity of acetylated lecithin was varied between 2.5% and 20%. The ingredients were mixed together using the preemulsion concentrate procedure described in Example 1. The results indicate that at least 4.5% acetylated lecithin was required to form a water-in-oil emulsion in the presence of an emulsifying agent and of an oil content of 17.9%. Lesser amounts (3% and 2.5% acetylated lecithin by weight) resulted in unstable oil-in-water emulsions.

Example 6

Sample formulations for non-lecithin containing parting compositions in accordance with the present invention are indicated in TABLES IVA and IVB, and are designated Examples A through K. Each of these compositions comprises 4 percent by weight phosphated mono- and diglyceride release agent obtained from Calgene Chemical, Inc. under the trade designation Q-1058 (which, as stated above, is believed to contain significant quantities of non-phosphated mono- and diglycerides), an edible oil component (which in the case of compositions I and J included medium chain triglycerides sold under the trade designation NeoBee M-5 by the Stepan Company.), monocalcium phosphate and water. Certain compositions among them also comprised decaglyceroldecaoleate obtained from Calgene Chemical, Inc. under the trade designation PGO-1010, as a polyglycerol ester of fatty acid supplemental emulsifier.

Release tests were conducted on all these formulations according to the procedure described above in Example 4, except that the various formulations were applied to the pan two at a time by spraying six pan cavities with one formulation and six pan cavities with another, and spraying was performed using a mechanical spray gun. For each muffin which remained in the pan after ten shakes, eight points were assessed to that pan cavity rather than fifteen points. The results of two release tests were used to calculate average release values.

The results are shown in TABLE IV(A) and IV(B).

TABLE IV(A)

| INGREDIENT | COMPOSITION INDEX LETTER | | | | | |
|---|---|---|---|---|---|---|
| | A | B | C | D | E | F |
| | (Percent of Formula By Weight) | | | | | |
| PM & DG (1) | 4% | 4% | 4% | 4% | 4% | 4% |
| PHW (2) | 30 | 30 | 30 | 20 | 20 | 20 |
| Soybean Oil | — | — | — | — | — | — |
| Hydrogenated Soybean Oil | — | — | — | — | — | — |
| Coconut Oil | — | — | — | — | — | — |
| Mineral Oil | — | — | — | 5 | 5 | 5 |
| Medium Chain Triglycerides | — | — | — | — | — | — |
| Monocalcium Phosphate | 1 | 3 | 6 | 1 | 3 | 6 |
| Decaglyceroldecaoleate | 2.5 | 2.5 | 2.5 | 2.5 | 2.5 | 2.5 |
| Water | 62.5 | 60.5 | 57.5 | 70.0 | 68.0 | 65.0 |
| Average Release Value | 2.46 | 1.58 | 3.33 | 0.68 | 0.42 | 0.71 |

(1) PM & DG = Phosphated mono- and diglycerides
(2) PHW = Partially hydrogenated winterized

TABLE IV(B)

| INGREDIENT | COMPOSITION INDEX LETTER | | | | |
|---|---|---|---|---|---|
| | G | H | I* | J | K |
| | (Percent of Formula By Weight) | | | | |
| PM & DG (1) | 4% | 4% | 4% | 4% | 5.33% |
| PHW (2) | — | — | — | 20 | — |
| Soybean Oil | — | — | — | — | — |
| Hydrogenated Soybean Oil | — | 20 | — | — | — |
| Coconut Oil | 20 | — | — | — | — |
| Mineral Oil | 5 | 5 | — | — | — |
| Medium Chain Triglyceride | — | — | 25 | 5 | 25 |
| Monocalcium Phosphate | 1 | 1 | 1 | 1 | 1 |
| Decaglyceroldecaoleate | — | — | — | — | 2.5 |
| Water | 70 | 70 | 70 | 70 | 66.17 |
| Average Release Value | 1.12 | 1.92 | — | 1.79 | 0.17 |

(1) PM & DG = Phosphated mono- and diglycerides
(2) PHW = Partially hydrogenated winterized
*Did not form a complete emulsion.

The data of TABLES IV(A) and IV(B) show that formulations comprising phosphated mono- and diglycerides, monocalcium phospate and water form water-in-oil emulsions that perform satisifactorily as parting compositions despite the absence of lecithin. The performance of composition K demonstrates the effectiveness of medium chain triglycerides as a substitute for edible oils in the edible oil component of the composition.

Example 7

Several foodstuffs parting compositions in accordance with the present invention were formulated as shown in the following Table V.

TABLE V

| INGREDIENT | COMPOSITION INDEX LETTER | | | | | |
|---|---|---|---|---|---|---|
| | L | M | N | O | P* | Q |
| | (Percent of Formula by Weight) | | | | | |
| Acetylated Lecithin | 12.0% | 9.0% | 5.0% | — | — | 6% |
| PM & DG (1) | — | — | 1.0 | 5.06 | 4.0 | — |
| PHW (2) Soybean Oil | 31.5 | 31.05 | 23.0 | 22.63 | 23.0 | 31.0 |
| Monocalcium Phosphate | 2.0 | 0.75 | 1.0 | 1.27 | 1.0 | 2.0 |
| Decaglycerol-decaoleate | — | 3.0 | 2.5 | 2.95 | 2.5 | 2.0 |
| Water | 54.5 | 55.75 | 67.5 | 68.09 | 69.5 | 59.0 |
| Average Release Value | 2.9 | 11.0 | 11.8 | — | — | 0.5 |

(1) PGEFA = Polyglycerol Ester of Fatty Acid
(2) PHW = Partially Hydrogenated Winterized
*Formulation did not form a complete emulsion.

Each of the compositions shown in Table V were prepared in the manner described above, and each formed a water-in-oil emulsion that could be dispensed through a pressure pump sprayer or applied to a cooking surface by means of a brush or other conventional applicator.

Example 9

A parting composition in which medium chain triglycerides were used to the exclusion of added edible oils in the edible oil component was prepared as follows: acetylated lecithin 7.4%; medium chain triglycerides 30%; monocalcium phosphate 2%; water 60.6%. The composition formed an emulsion, and upon pan testing as described above in Example 6, a release value of 1.1 was attained.

Two other formulations according to the present invention were prepared as follows.

A composition designated R was prepared, comprising 6 percent standard lecithin, 31 percent partially hydrogenated winterized soybean oil, 2 percent monocalcium phosphate, 2 percent PG-1010 decaglycerol-decaoleate and 59 percent water. A proper emulsion resulted from these materials, and when the parting composition was tested with the blueberry muffin mix as described above in Example 6, a release value of 0.91 was obtained.

A composition designated S was prepared, comprising 10 percent acetylated-hydroxylated lecithin, 30 percent partially hydrogenated winterized soybean oil, 1 percent monocalcium phosphate, 2 percent phosphated mono- and diglycerides and 57 percent water by weight of the composition. A water-in-oil parting composition emulsion resulted.

While the invention has been described in detail with respect to specific preferred embodiments thereof, it is to be understood that upon a reading of the foregoing description, variations to the specific embodiments disclosed may occur to those skilled in the art and it is intended to include such variations within the scope of the appended claims.

What is claimed is:

1. A foodstuffs parting composition for coating cooking surfaces, comprising a water-in-oil emulsion comprising;
    a release agent comprising at least one of (a) lecithin and (b) mono- and diglycerides;
    an edible oil component;
    an emulsifying agent in an amount effective to facilitate the formation of the water-in-oil emulsion and selected from the group consisting of monocalcium phosphate, calcium chloride dihydrate, dibasic magnesium phosphate trihydrate, potassium chloride, combinations thereof; and
    water.

2. The parting composition of claim 1 wherein the lecithin comprises chemically modified lecithin.

3. The parting composition of claim 1 wherein the release agent comprises at least one of acylated lecithin and acetylated-hydroxylated lecithin.

4. The parting composition of claim 3 wherein the acylated lecithin comprises acetylated lecithin and wherein the emulsifying agent constitutes from about 0.1 to about 9 percent by weight of the composition.

5. The parting composition of claim 1 wherein the release agent comprises mono- and diglycerides.

6. The parting composition of claim 1, claim 4 or claim 5 wherein the emulsifying agent comprises monocalcium phosphate in an amount greater than 0.5 percent by weight of the composition.

7. The parting composition of claim 1, claim 4 or claim 5 wherein the edible oil component constitutes from about 10 to about 45 precent by weight of the composition.

8. The parting composition of claim 6 wherein the edible oil component comprises medium chain triglycerides.

9. The parting composition of claim 1 wherein the release agent constitutes from about 1 to about 20 percent by weight of the composition;
    wherein the edible oil component constitutes from about 10 to about 45 percent by weight of the composition; and
    wherein the emulsifying agent selected constitutes at least about 1.0 percent by weight of the composition.

10. The parting composition of claim 9 wherein the emulsifying agent comprises monocalcium phosphate in an amount of from about 1.0 to about 9.0 percent by weight of the composition.

11. The parting composition of claim 10 wherein the edible oil component comprises medium chain triglycerides.

12. The parting composition of claim 10 wherein the monocalcium phosphate emulsifying agent constitutes from about 1.0 to about 4 percent by weight of the composition.

13. The parting composition of claim 9 or claim 11 wherein the release agent comprises mono- and diglycerides and is substantially free of lecithin.

14. The parting composition of claim 13 wherein the mono- and di-glycerides comprise phosphate mono- and di-glycerides.

15. The parting composition of claim 9 wherein the edible oil component comprises an edible oil and medium chain triglycerides and wherein the release agent comprises mono- and diglycerides and is substantially free of lecithin.

16. The parting composition of claim 1, claim 4, claim 5 or claim 9 further comprising at least one polyglycerol ester of a fatty acid in an amount of from about 0.1 to about 6.0 percent by weight of the composition.

17. The parting compostion of claim 16 wherein the supplemental emulsifying agent comprises at least one of decaglyceroldecaoleate and decaglyceroloctaoleate.

18. The parting composition of claim 9 comprising lecithin in an amount of at least about 4.5 percent by weight of the composition.

19. The parting composition of claim 1 or claim 9 further comprising an effective amount of a suspending agent.

20. The parting composition of claim 9 wherein the release agent comprises phosphated mono- and diglycerides of fatty materials in an amount of not more than about 10 percent by weight of the composition.

21. A foodstuffs parting composition for coating cooking surfaces comprising a water-in-oil emulsion comprising from about 4.5 to about 20 percent by weight acetylated lecithin, an edible oil component in an amount of from about 10 to about 45 percent oil by weight of the composition, from about 1.0 to about 4 percent monocalcium phosphate by weight of the composition, and water.

22. The parting composition of claim 21 wherein the edible oil component comprises medium chain triglycerides in an amount of not more than about 5 percent by weight of the composition, and an edible oil.

23. The parting composition of claim 21 or claim 22 further comprising from about 0.1 to about 9 percent by weight phosphated mono- and diglycerides.

* * * * *

UNITED STATES PATENT AND TRADEMARK OFFICE
CERTIFICATE OF CORRECTION

PATENT NO. : 5,431,719
DATED : July 11, 1995
INVENTOR(S) : Clarence P. Clapp et al It is certified that error appears in the above-indentified patent and that said Letters Patent is hereby corrected as shown below:

```
In column 1, line 41, replace "a emulsion" with --an emulsion--.
In column 4, line 30, replace "lecthin" with --lecithin--.
In column 11, line 37 (in TABLE II), replace "3 mo. 100°F.)" with
                    --(3 mo. 100° F.)--
In column 11, immediately following TABLE II, place the footnote
             --(1) See Example 3 for characterization of
                    the appearance of the emulsion.--
In column 15, bridging lines 2 and 3, replace "diglyerides" with
                    --diglycerides--

In column 16, line 9 (Claim 1), replace "prising;" with
                    --prising:--
In column 16, line 38 (Claim 7), replace "precent" with
                    --percent--.
In column 17, line 11 (Claim 17), replace "compostion" with
                    --composition--.
```

Signed and Sealed this

Twenty-fourth Day of October, 1995

*Attest:*

BRUCE LEHMAN

*Attesting Officer*     *Commissioner of Patents and Trademarks*